April 20, 1948.　　　W. B. MITCHELL　　　2,440,058
WIRE TWISTER

Filed Sept. 5, 1945

*Inventor*
WALTER B MITCHELL

By Clarence A O'Brien
and Harvey B Jackson
*Attorneys*

Patented Apr. 20, 1948

2,440,058

UNITED STATES PATENT OFFICE 2,440,058

WIRE TWISTER

Walter B. Mitchell, Seattle, Wash.

Application September 5, 1945, Serial No. 614,523

3 Claims. (Cl. 140—118)

My invention relates to wire twisters and has for its primary object to provide a loop forming device for fishing leaders.

Another object of this invention is to provide a one-piece wire twister.

A further object of the invention is to provide an oblong manipulator having a wire twister at one end and a wire grip at the opposite end thereof.

Figure 1:
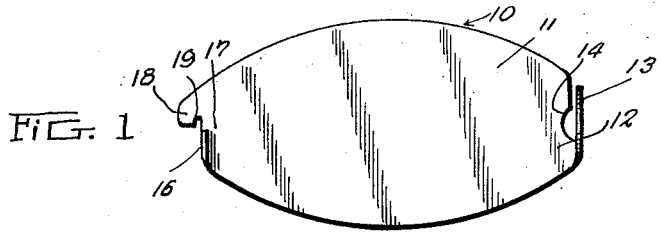
Figures 2, 3, 4:
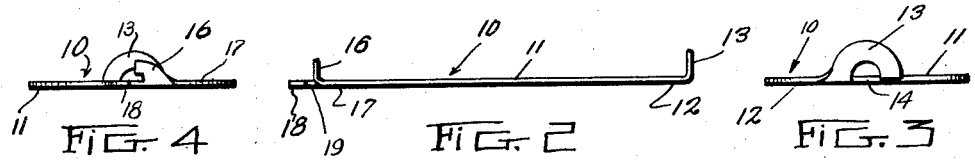
Figure 5:
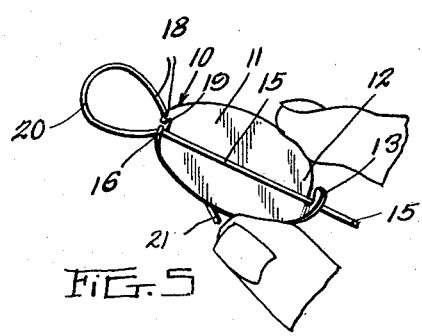
Figure 6:
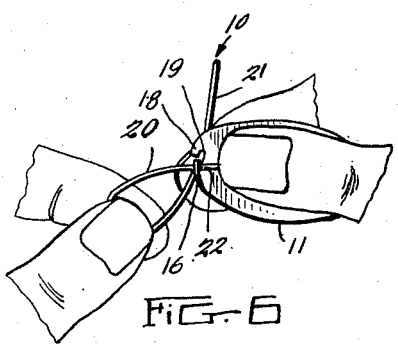
Figure 7:
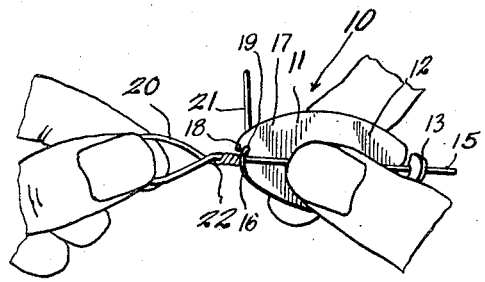
Figure 8:
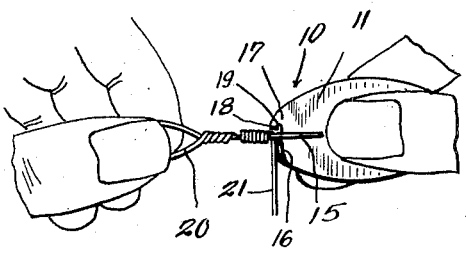

Other features and advantages will become more readily apparent from the following description and the accompanying illustrative drawings in which:

Figure 1 is an elevational view of my twister,
Figure 2 is an edge view thereof,
Figure 3 is an end view of the twister,
Figure 4 is another end view, and
Figures 5 to 8 are views illustrating the method of forming a fishing leader loop.

In the accompanying drawings as above enumerated and in the following specification, like characters of reference indicate like parts throughout and in which 10, indicates my invention which consists of a preferably oval shaped flat piece of metal 11, the end 12, of which is turned up at right angles to form a hook 13, and is provided with a slight cut out 14, inwardly of the hook whereby a wire 15, may be caught under the hook after which it is passed longitudinally across the plate 11, and caught under a somewhat similar hook 16. The end 17, of the plate is also provided with an extension 18, having a notch 19, between the extension and the said end 17. The spindle-forming portion 15 of the wire, is also carried under the hook 16, and a loop 20, formed therein by the fingers of the user, the loop being hold while the member 11, is turned a sufficient number of times to twist the terminal 21, of the wire upon its portion 22, whereby the loop is completely formed and after which the projection of terminal 21, is broken off, thus completing the loop.

The method of use for the device is as follows:

No. 1: Draw wire through guide at bottom of twister, place in slot on top left hand side, make a loop and place end in slot on right hand side. This will leave end of wire protruding back of twister.

No. 2: Hold wires firmly against twister with hand and turn loop with left hand which will produce a twist; then hold loop firmly with left hand and turn twister with right hand to tie twist using a small amount of effort to wind tie closely. To break off end of wire after loop and ties are completed, hold loop firmly with left hand and twist end.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

I claim:

1. A wire twister adapted to assist in forming a loop and twisting the free end of the loop on fishing line leaders comprisig a wire receptive and backing plate, said plate being flat on at least one side and having an outstanding hook at one end adapted to hook over the spindle-forming portion of the wire, said plate having a similar hook at its opposite end in alignment with the first-named hook and thus properly adapted for passage and retention of another portion of the wire, said plate, at its last-named end, being provided with an extension and said extension projecting beyond said hook and forming a finger, said finger being such and so situated in respect to the hook to coact with a free end portion of the wire, after the latter has been looped, this in a manner to twist said free end portion by coiling same around said spindle portion.

2. The structure specified in claim 1, said extension lying in a plane with the flat surface of said plate, and having a keeper notch formed therein adapted to coact with said second-named hook during the twisting and coiling stage.

3. As a new article of manufacture, a wire twister expressly adapted to facilitate forming a loop and twisting and coiling the free end thereof during the step of producing a loop on a fishing line leader comprising a substantially ovate flat-faced plate, said plate being adapted to be grasped and rotated with the fingers of one hand of the user, said plate having a lateral hook at one end, said hook being at approximate right angles to an adjacent flat face of said plate, said plate being provided at its opposite end with a marginal extension, said extension constituting a finger, being in a plane with the body of the plate and having a notch, said plate being formed at the last-named end with another hook, said hook being at right angles to the body of the plate and in alignment with the first-named hook and at a point spaced inwardly of the extension and substantially lined up with said notch.

WALTER B. MITCHELL.

REFERENCES CITED

The following references are of record in the file of this patent:

UNITED STATES PATENTS

| Number | Name | Date |
|---|---|---|
| 620,826 | Bardelmeier | Mar. 7, 1899 |
| 852,836 | Hays | May 7, 1907 |